United States Patent
Goodell et al.

(10) Patent No.: US 8,080,227 B1
(45) Date of Patent: Dec. 20, 2011

(54) PROCESSES FOR PRODUCING CARBON NANOTUBES AND CARBON NANOTUBES PRODUCED THEREBY

(75) Inventors: Barry S. Goodell, Bangor, ME (US); Xinfeng Xie, Orono, ME (US); Yuhui Qian, Old Town, ME (US); Dajie Zhang, Columbia, MD (US); Michael L. Peterson, Orono, ME (US); Jody L. Jellison, Bangor, ME (US)

(73) Assignee: University of Maine, Orono, ME (US)

( * ) Notice: Subject to any disclaimer, the term of this patent is extended or adjusted under 35 U.S.C. 154(b) by 828 days.

(21) Appl. No.: 12/012,236

(22) Filed: Jan. 31, 2008

Related U.S. Application Data

(60) Provisional application No. 60/898,884, filed on Feb. 1, 2007.

(51) Int. Cl.
*D01F 9/16* (2006.01)
(52) U.S. Cl. .................................. 423/447.9
(58) Field of Classification Search .... 423/447.1–447.3, 423/445 B, 447.4, 447.5, 447.6, 447.7, 447.8, 423/447.9; 977/742–754, 842–848; 428/367
See application file for complete search history.

(56) References Cited

U.S. PATENT DOCUMENTS

| | | | |
|---|---|---|---|
| 6,046,375 A | | 4/2000 | Goodell et al. |
| 6,806,397 B1 * | | 10/2004 | Reilly ............................ 585/446 |
| 2009/0309072 A1 * | | 12/2009 | Hwang et al. ................. 252/506 |
| 2010/0247419 A1 * | | 9/2010 | Nguyen ....................... 423/447.2 |
| 2010/0278715 A1 * | | 11/2010 | Khe ........................... 423/447.1 |

OTHER PUBLICATIONS

Kang, et al., Obtaining carbon nanotubes from grass, Nanotechnology 2005; 16: 1192-1195.*
Goodell, et al., Carbon Nanotubes Produced from Natural Cellulosic Materials, Journal of Nanoscience and Nanotechnology 2008; 8: 2472-2474.*
Reibold, et al., Carbon nanotubes in an ancient Damascus saber, Nature 2006; 444: 286.*
Goodell, B., et al., Carbon Nanotubes Produced from Natural Cellulosic Materials, J. Nanosci. Nanotechnol. 2008, vol. 8, No. 5, p. 1-3.
Reibold, M., et al., Carbon Nanotubes in an Ancient Damascus Sabre, Nature Publishing Group, vol. 444, Nov. 16, 2006, p. 286.
Sanderson, Katharine, Sharpest Cut from Nanotube Sword—Carbon Nanotech May Have Given Swords of Damascus Their Edge, Nature News, Published online: Nov. 15, 2006; l doi:10.1038/news061113-11.
Srinivasan, C., Do Damanscus Swords Reveal India's Mastery of Nanotechnology?, Current Science, vol. 92, No. 3, Feb. 10, 2007, p. 279-280.

* cited by examiner

*Primary Examiner* — Daniel C. McCracken
(74) *Attorney, Agent, or Firm* — MacMillan, Sobanski & Todd, LLC

(57) ABSTRACT

A carbon nanotube formation process of producing carbon nanotubes includes controlled heating of plant fiber materials in an oxygen-limited atmosphere. The plant fiber materials may be heated either cyclically or by rapid heating to produce the carbon nanotubes.

27 Claims, 3 Drawing Sheets
(2 of 3 Drawing Sheet(s) Filed in Color)

PROCESSES FOR PRODUCING CARBON NANOTUBES AND CARBON NANOTUBES PRODUCED THEREBY

CROSS-REFERENCE TO RELATED APPLICATIONS

The present invention claims the benefit of the provisional patent application Ser. No. 60/898,884 filed Feb. 1, 2007.

STATEMENT REGARDING SPONSORED RESEARCH

This invention was made with government support from the Office of Naval Research under Grant No N00014-06-1-0156, and Grant No. BAA0-60-001. The government has certain rights in this invention.

BACKGROUND OF THE INVENTION

There is no admission that the background art disclosed in this section legally constitutes prior art.

Carbon nanotubes (CNTs) have attracted significant interest in recent years because of their extraordinary mechanical, electrical and thermal properties. Typically, carbon nanotubes have a diameter of about 10 nm to about 100 nm. Radushlevich and Lukyanovich (Carbon, 2006, Vol. 44, 1621-1623) were the first group to clearly image 50 nanometer diameter carbon tubes. Later work by Oberlin, Endo, and Koyama (J. Cryst. Growth, 1976, Vol. 32, 335) showed that hollow carbon fibers with nanometer-scale diameters could be produced using a vapor-growth technique. Subsequent work by Iijima (Nature, 1991, Vol. 354, 56-58) showed that carbon nanotubes (CNTs) were produced in arc-burned carbon rods and this work has fostered continued interest from research groups and industry in CNTs because of their remarkable electrical, mechanical, and thermal properties and their potential for a variety of applications. CNTs are unique tubular structures of nanometer diameter and may consist of one wall (single-walled nanotubes, SWNTs) to several, and up to hundreds (multi-walled nanotubes, MWNTs) of concentric carbon shells. Their molecular structure is closely related to the hexagonal arrangement of carbon atoms in graphite sheets. Carbon nanotubes have been prepared by employing a variety of strategies such as chemical vapor deposition (CVD) (Appl. Phys. Lett., 1993, Vol. 62, 202-204), arc-discharge (Nature, 1991, Vol. 354, 56-58), and laser-ablation (Chemical Physics Letters, 1995, Vol. 243, 49-54); the last two methods involving the ablation of a carbon source allow the carbon to be redeposited in tubular form. Although considerable effort has been made to improve the techniques for carbon nanotube production, there are still many problems that prevent the manufacturing of large volumes of carbon nanotubes in a controlled manner. Extremely high temperatures, complicated controls, difficult purification processes, and very low yields currently have made it too expensive for production of the bulk quantities of carbon nanotubes that would be required for large-scale structural applications.

There is a growing interest in the development of new carbon materials directly from plant materials to make carbon composites (Carbon, 1997, Vol. 35, 259-266; 45th International SAMPE, 2000), carbide ceramics (Holzforschung, 2003, Vol. 57, 440-446; J. of the European Ceramic Society, 2004, Vol. 24, 495-506; Carbon, 2005, Vol. 43, 1174-1183), and environmental sorbents (Organic Geochemistry, 2006, Vol. 37, 321-333). Most of these studies have sought to use the natural cellular structure of the plant tissue and the porous nature of the cell wall, which is enhanced during carbonization. However, no research has been conducted to produce carbon materials making use of the nanometer scale arrangement of plant cell wall components.

SUMMARY OF THE INVENTION

The present invention is directed to the production of carbon nanotubes, e.g., single wall carbon nanotubes (SWNTs) and/or multi-walled carbon nanotubes (MWNTs), using plant fiber material as a unique starting carbon source. One of the advantages of using plant fiber material is that lower temperatures can be used to produce carbon nanotubes when compared to other conventional methods of carbon nanotube production which include arc-discharge, chemical vapor deposition, and laser-ablation. The ability to use cellulosic plant fibers as raw materials to produce carbon nanotubes also has the potential to dramatically reduce costs and improve the processing performance of these carbon nano-materials.

In one aspect of the invention, a method of producing carbon nanotubes using a cyclic heating process is provided.

In a particular aspect, there is provided herein a carbon nanotube formation process comprising heating plant cellular material in the presence of a controlled amount of oxygen for at least one heating cycle. The heating cycle includes controlling at least one of: i) a rate of temperature change, ii) range of temperatures between a desired maximum temperature and a desired minimum temperature, and iii) a time period at which the plant cellular material is exposed to heat; the heating period being sufficient to produce carbon nanotubes.

In certain embodiments, no added catalyst is needed, although metal compounds which may act as a catalyst may be found naturally in the cellulosic plant fibers.

In other embodiments, a suitable catalyst that forms nanoparticles when heated in the carbon nanotube formation process can be used. Non-limiting examples of suitable catalysts include a metal or metal salt, such as nickel chloride or nickel acetate. Other examples of catalyst are one or more transition metals. Also, the metal catalyst can include palladium and/or platinum.

In another aspect, the present invention also includes carbon nanotube formation processes that use a single cycle, or flash-heating process. The single cycle carbon nanotube formation process also produces single walled nanotubes and multi-walled nanotubes from cellulosic plant fibers.

In one embodiment, thermomechanical wood pulp fiber (TMP) is processed through multiple, rapid low-temperature (up to about 600° C.) carbonization cycles in the presence of a controlled amount of oxygen. In one particular embodiment, wheat straw fibers or pine needles are mixed with about 0.1 weight percent of a catalyst, for example, a metal salt, e.g. nickel chloride. The wheat straw fibers or pine needles catalyst mixture is then subjected to a rapid flash-heating process at temperatures up to about 1000° C. in the presence of controlled amount of oxygen.

In a broad aspect, there is provided herein a process for producing carbon nanotubes comprising: heating a supply of plant cellular material in the presence of a controlled amount of oxygen for at least one heating cycle; the heating cycle including controlling at least one of: i) a rate of temperature change during the heating cycle, ii) a range of temperatures between a desired maximum temperature and a desired minimum temperature, and iii) a time period at which the plant cellular material is exposed to heat; the heating cycle being sufficient to produce carbon nanotubes.

In certain embodiments, the plant cellular material comprises fibers from wood and non-wood species, including as a non-limiting example, lignocellulosic fibers.

In another broad aspect, there is provided herein carbon nanotubes derived from natural cellulosic materials. In certain embodiments at least several of the carbon nanotubes are single walled nanotubes. Also, in certain embodiments, at least several of the carbon nanotubes are multi walled nanotubes.

In another broad aspect, there is provided herein a carbon nanotube formation process for producing carbon nanotubes comprising: heating a reaction vessel to a desired temperature; adding a supply of plant cellular material to the heated reaction vessel for a desired time period, the reaction vessel having a controlled amount of oxygen; removing the supply of plant material from the reaction vessel and therein from the heat; and allowing the supply of plant material to cool, whereby carbon nanotubes are produced. In certain embodiments, one heating cycle is used and wherein a substantially constant temperature is used.

In yet another broad aspect, there is provided herein a process of producing a composite having carbon nanotubes therein, where the process includes heating a substrate in the presence of a carbon source comprising plant cellular material and heating the substrate and supply of plant cellular material using one or more of the carbon nanotube formation processes described herein. In certain non-limiting embodiments, the substrate comprises one or more of iron or steel, or other metals and other composites such as fiber reinforced polymer (FRP) composites. In one embodiment, the process can include incorporating the supply of plant cellular material into molten iron, whereby steel having carbon nanotubes within the steel is produced.

In still another broad aspect, there is provided herein a composite comprising: i) at least one metal, and ii) carbon nanotubes derived from natural cellulosic materials.

In yet another broad aspect, there is provided herein a process of producing a preform material having carbon nanotubes therein, comprising: heating a substrate in the presence of a carbon source comprising plant cellular material and heating the substrate and supply of plant cellular material according to the carbon nanotube formation process of claim 1. The preform can infused with a desired material, including the non-limiting example of one or more phenolic resins.

Various objects and advantages of this invention will become apparent to those skilled in the art from the following detailed description of the preferred embodiment, when read in light of the accompanying Figures.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the Patent Office upon request and payment of the necessary fee.

DETAILED DESCRIPTION OF THE INVENTION

Figure 1:
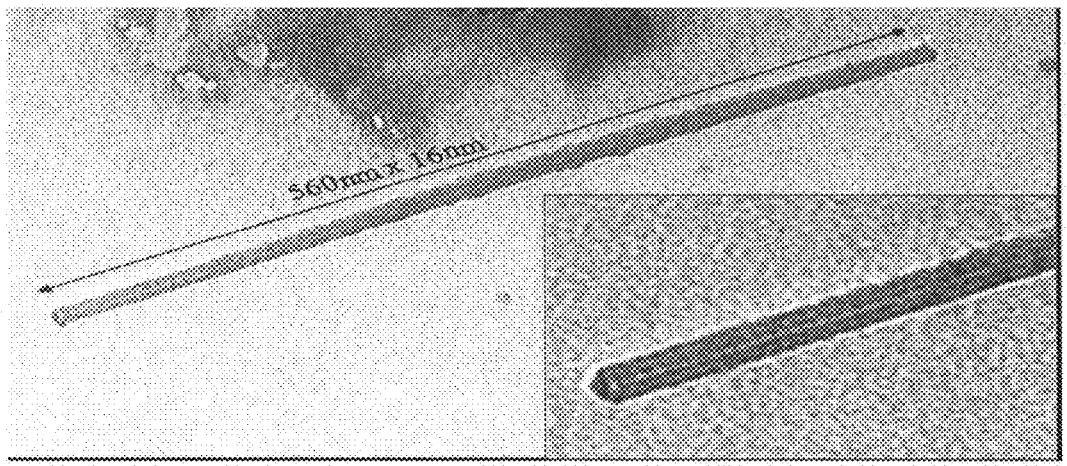
FIG. 1 is a TEM image of a multi-walled nanotube produced from thermomechanical wood pulp fibers using a multi-cyclic carbon nanotube formation process. The particular carbon nanotube in the image is about 16 nanometers in diameter.

The features and advantages of the present invention will be apparent from the following more particular description of embodiments of the invention. All percentages are by weight unless otherwise indicated.

As used in the specification and claims, the singular form "a", "an" and "the" include plural references unless the context clearly dictates otherwise. For example, the term "a fiber" includes a plurality of fiber, including mixtures thereof.

Described herein is a method for the production of carbon nanotubes from natural cellulosic plant materials.

In a broad aspect, the present invention is directed to a novel carbon nanotube formation process for producing carbon nanotubes, particularly, multi-walled carbon nanotubes (MWNTs), from natural plant materials. Non-limiting examples of natural plant materials include lignocellulosic fibers, such as thermomechanical wood pulp (TMP) fibers, wheat straw fibers and other straw fibers, bamboo and hemp fibers. In certain embodiments, the plant cellular material comprises lignocellulosic materials. It is to be understood that the types of lignocellulosic materials which may be processed are broad, and that non-limiting examples also include wood shavings and sawdust, wheat straw, and oat straw chaff. These examples of suitable materials are not intended to be limiting and are provided solely as an indication of some of the materials that can be processed. For instance other materials such as bark and recycled paper can be used as long as the cell wall nano-architecture is retained in whole or part. It is also to be understood, that in certain embodiments, more than one type of plant material can be used in the carbon nanotube formation process described herein.

In one aspect, there is described herein a carbon nanotube formation process where formation of carbon nanotubes occurs in the presence of a controlled amount of oxygen. The inventors herein have now discovered a carbon nanotube formation process where a controlled use of oxygen in a relatively low temperature environment containing lignocellulosic plant materials produces carbon nanotubes. Combined with low temperature processing, the use of natural cellulose fibers makes the carbon nanotube formation process a very cost effective and highly competitive process as compared to other existing multi-walled nanotube production methods.

In particular embodiments, the carbon source material may be any wood or non-wood lignocellulosic fibers which, upon heating in the presence of a suitable amount of oxygen, produces carbon nanotube structures.

In one embodiment, thermomechanical wood pulp (TMP) fiber is initially preheated in air, for example, at a temperature of about 200° C. to about 250° C., (in one non-limiting example, at about 240° C.), for a time sufficient to partially carbonize the raw material. In certain embodiments, the time periods range from about 20 minutes to about several days; in others, from about 30 to about 80 minutes, and in still others from about 60 minutes. It is to be noted that, in certain embodiments, the preprocessing of the raw material at 240° C. is to stabilize the nano-architecture by partially carbonizing it. For example, the bamboo sample, which showed nano-channels, was processed for 24 hours. Thus, in certain embodiments, lower temperature and longer time leads to better results, and the time period can be up to several days.

In another embodiment, the wood or non-wood lignocellulosic fibers are pre-treated by washing with alcohol and water. The pretreated fibers are then placed in a furnace such as, for example, a tube furnace with a vacuum purge and a controlled oxygen inlet.

In one embodiment, the process for producing carbon nanotubes includes the following steps:
 a) establishing a supply of plant cellular material in a reaction vessel;
 b) introducing a controlled amount of oxygen into the reaction vessel;
 c) heating the reaction vessel for a heating cycle, the heating cycle including controlling:
  i) a rate of temperature change during the heating cycle,
  ii) a range of temperatures between a desired maximum temperature and a desired minimum temperature, and
  iii) a time period at which the plant cellular material is exposed to heat;
  iv) the amount of oxygen being introduced into the reaction vessel;
 d) subjecting the reaction vessel to additional heating cycles sufficient to produce carbon nanotubes;
 e) removing the reaction vessel from the heat, and
 f) cooling the reaction vessel at a desired rate of cooling.

In another embodiments, a process for producing carbon nanotubes includes:
 a) establishing a supply of plant cellular material in a reaction vessel;
 b) introducing a controlled amount of oxygen into the reaction vessel;
 c) subjecting the reaction vessel to a heating cycle which includes heating and then cooling the reaction vessel while maintaining the temperature between a desired maximum temperature and a desired minimum temperature,
 d) subjecting the reaction vessel to additional heating cycles sufficient to produce carbon nanotubes; and
 e) cooling the reaction vessel to a temperature below the temperature in the heating cycle.

In certain embodiments the carbon nanotube formation process can include heating the reaction vessel at an accelerated rate of temperature change. In certain embodiments, the accelerated rate includes heating the plant cellular material where the temperature is increased at about 1 to about 5° C./sec. In certain embodiments, the accelerated rate is about 5 to about 10° C./sec. In other embodiments, the accelerated rate is about 10 to about 30° C./sec. In still other embodiments, the accelerated rate is about 30 to about 60° C./sec. Thereafter, in many embodiments, the reaction vessel is quickly removed from the heated furnace and cooled naturally to room temperature. In other embodiments, the reaction vessel can be rapidly cooled at a rate faster that exposing the reaction vessel to ambient temperatures.

In one particular embodiment, the pretreated fibers are processed through multiple, rapid low-temperature carbonization cycles in the presence of a controlled amount of oxygen. In one non-limiting example, the cycles are conducted for about 20 times to about 50 times; in others about 30 times to about 40 times; and in still other about 35 times. The carbonization temperature can range between about 400° C. to about 600° C. (in one non-limiting example, at about 500° C.). In each cycle, the temperature is held for about 5 minutes to about 15 minutes in one non-limiting example, for about 10 minutes), before cooling and then being prepared for the next heating/cooling cycle. Oxygen is added to the system at the beginning of each cycle. In certain preferred embodiments, a suitable amount of oxygen is added in each cycle to ensure the proper carbon nanotube formation, but to also limit any excessive oxidative decomposition of the materials.

In certain embodiments, the amount of oxygen can be about 20 to about 100 milliliter per gram of plant cellular material. In certain embodiments, the amount of oxygen used during heating ranges from about 1 to about 10 milliliter per gram of plant cellular material. In certain embodiments, the oxygen amounts range from about 1 to about 8 milliliter per gram of fiber; in other embodiments, from about 2 to about 6 milliliter per gram of fiber; and in still other embodiments, from about 4 milliliter per gram of fiber. Also, in certain embodiments, the oxygen can be supplied substantially continuously, and in other embodiments, the oxygen can be supplied in a pulsed manner.

In certain embodiments, the heating of heating plant cellular material in the presence of the controlled amount of oxygen occurs in a reaction vessel wherein a balance of the atmosphere in the reaction vessel comprises an inert gas. In certain embodiments, the balance of the atmosphere comprises an inert gas including one or more of nitrogen and argon. Also, the oxygen can be either supplied substantially continuously or in pulses to the reaction vessel. Further, in certain embodiments, more than one heating cycle is used and fluctuating temperatures are used to heat the supply of plant cellular material in repeating cycles.

Also, in certain embodiments, the heating cycle is conducted as a batch process. In still other embodiments, the reaction vessel can be at less than atmospheric pressure during at least one the heating cycle.

Table I below lists several of the samples tested. Cyclic heating of the samples described in Table 1 using the procedures as described resulted in carbon nanotube production only from the samples which contained intact plant cell walls either in total or in part.

TABLE 1

Source Materials for Carbon Nanotube Formation

| Carbon Material | Form/morphology |
| --- | --- |
| Wood fiber (*Pinus ponderosa*) | Dried thermomechanical pulp (TMP) |
| Organosolv lignin | Dried fine powder |
| Ashless filter paper | 10 mm wide by 20 mm long strips |
| Avicel ® cellulose | 20 micron microcrystalline cellulose |
| α- cellulose | Dried fine powder |
| Bamboo | Dried bamboo fiber |

Figure 2:
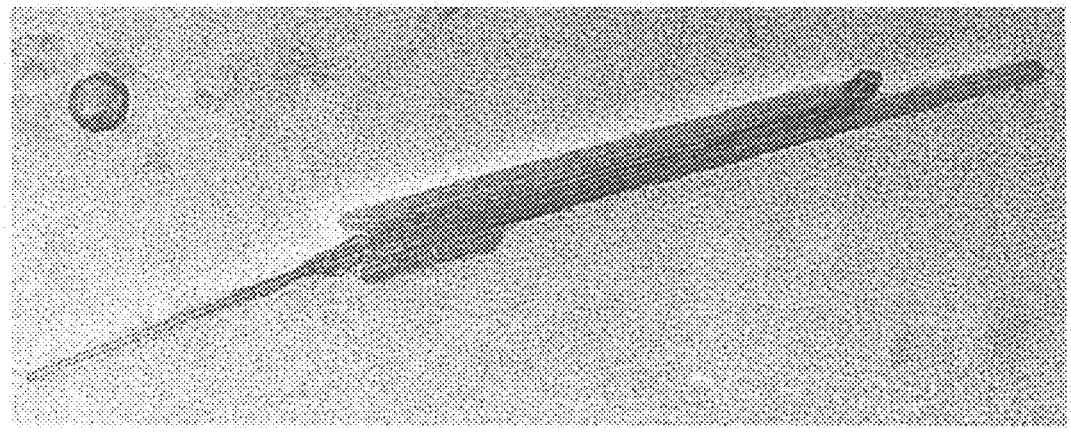
FIG. 2 (shown as substantially same scale as in FIG. 1) shows a TEM image of a multi-walled nanotube bundle made from TMP fibers by a multi-cyclic carbon nanotube formation process.

FIG. 1 and FIG. 2 show the TEM images of multi-walled nanotubes obtained by multiple, rapid low-temperature (400° C.) carbonization of TMP fibers in the presence of 4 milliliter oxygen per gram of fiber (each cycle). The outside diameters of the carbon nanotubes produced was about 16 nm and the inside diameter was about 4 nm. The latter 4 nm falls in the range of the cross sectional dimension (4 nm by 10 nm) of cellulose microfibrils in the wood cell wall. While not wishing to be bound by theory, the inventors herein now believe that the nanotubes are produced by the ablation of cellulose microfibrils during the carbon nanotube formation process described herein, and that the nano-morphology or nano-architecture of the plant cell wall greatly aids in the production of nanotubes at low temperatures. It is to be noted that the inventors herein have also confirmed the oxidative difference in reactivity between cellulose carbon and lignin carbon obtained at 400° C. and 500° C. where the results demonstrate the preferential ablation of cellulose carbon in incompletely carbonized plant materials at lower temperatures with ablation of lignin at somewhat higher temperatures. While not wishing to be bound by further theory, the inventors herein now believe that the process described herein permits the controlled ablation of cellulose microfibrils within a modified lignin matrix which, in turn, permits the carbon vapor from the cellulose to be concentrated in a "nano-channel" within the plant cell wall undergoing carbonization under the specified controlled conditions.

A carbon nanotube formation process for producing carbon nanotubes comprising:
  a) pre-heating a reaction vessel to a desired temperature;
  b) introducing a supply of plant cellular material in the pre-heated reaction vessel;
  c) introducing a controlled amount of oxygen into the pre-heated reaction vessel;
  d) subjecting the pre-heated reaction vessel to a single heating cycle which includes heating the pre-heated reaction vessel to temperatures up to about 1000° C. in the presence of the controlled amount of oxygen; and,
  e) cooling the reaction vessel at a desired rate of cooling.

In one embodiment, wheat straw fibers or pine needles are mixed with about 0.1 weight percent of a catalyst such as a metal salt, e.g. nickel chloride to form pretreated fibers. After initial drying at about 105° C. in air for about 1 hour, the pretreated fibers or needles then undergo a rapid flash-heating process up to temperatures of about 1000° C. in the presence of a controlled amount of oxygen.

In certain embodiments, the rapid or flash heating process includes heating the plant cellular material for short periods of time. In certain embodiments, the flash heating periods are about 3 to about 60 seconds. In other embodiments, the flash heating periods are about 15 to about 45 seconds. In still other embodiments, the flash heating periods are about 5 to about 10 seconds. Thereafter, in many embodiments, the reaction vessel is quickly removed from the heated furnace and cooled naturally to room temperature. In other embodiments, the reaction vessel can be rapidly cooled at a rate faster that exposing the reaction vessel to ambient temperatures.

Figure 3:
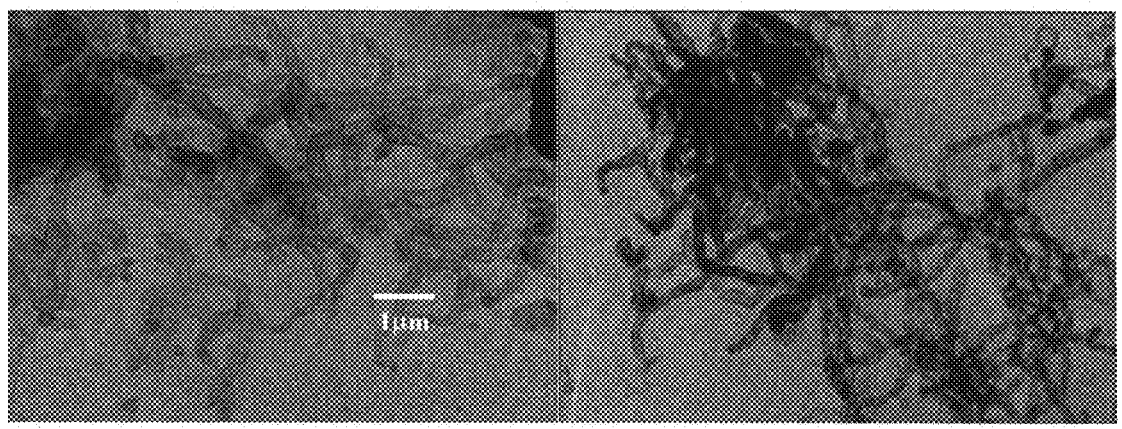
FIG. 3 shows TEM images of multi-walled nanotubes produced from wheat straw fibers using a flash-heating carbon nanotube formation process. The nanotubes have average diameters of about 90 nanometers.
Figure 4A:
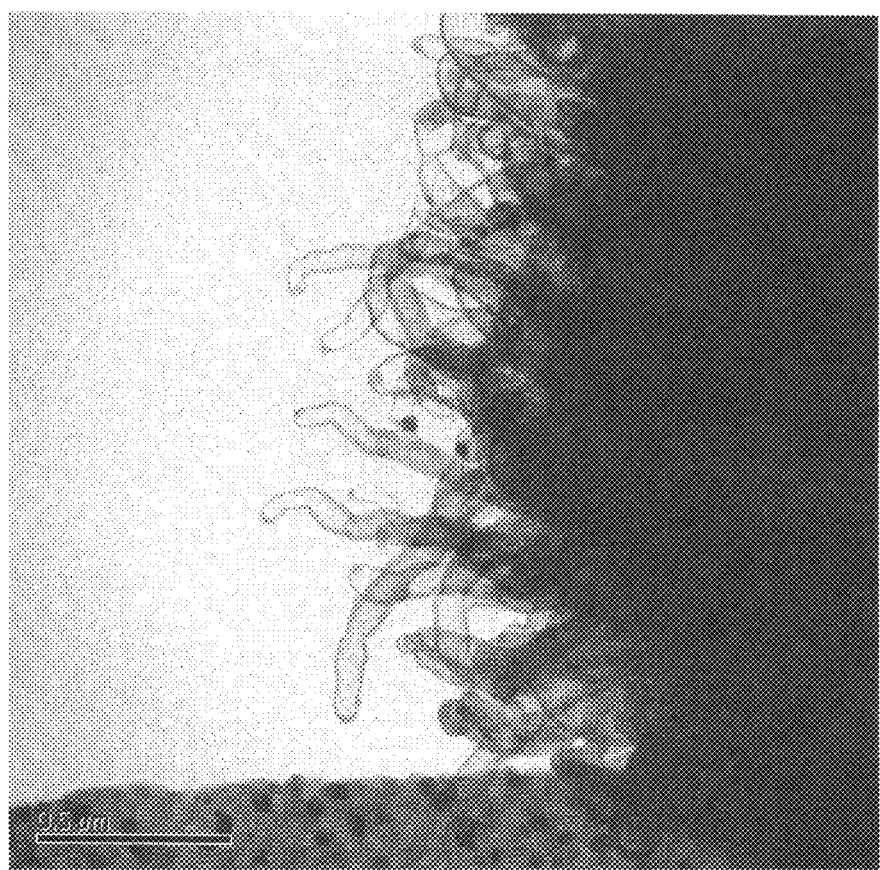
FIG. 4A and FIG. 4B shows TEM images of multi-walled nanotubes produced from pine needles using a flash-heating process.
Figure 4B:
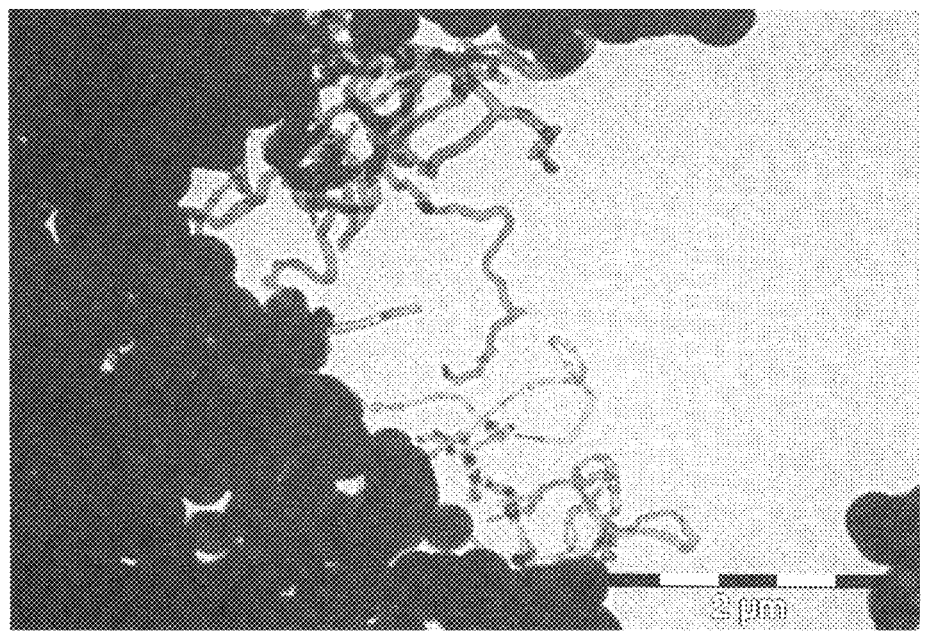

FIG. 3 and FIG. 4 show the TEM images of multi-walled nanotubes that were obtained where the multi-walled nanotubes have average outside diameters of about 90 nanometers. The carbon nanotube formation process greatly shortens the processing time needed for multi-walled nanotube production and significantly increases multi-walled nanotube yields as well. Large volumes of multi-walled nanotubes can be produced using the carbon nanotube formation process described herein.

Thermogravimetric analysis was also used to analyze the ablation of the cellulose filter paper and lignin to determine the carbon ablation sequence.

Figure 5:
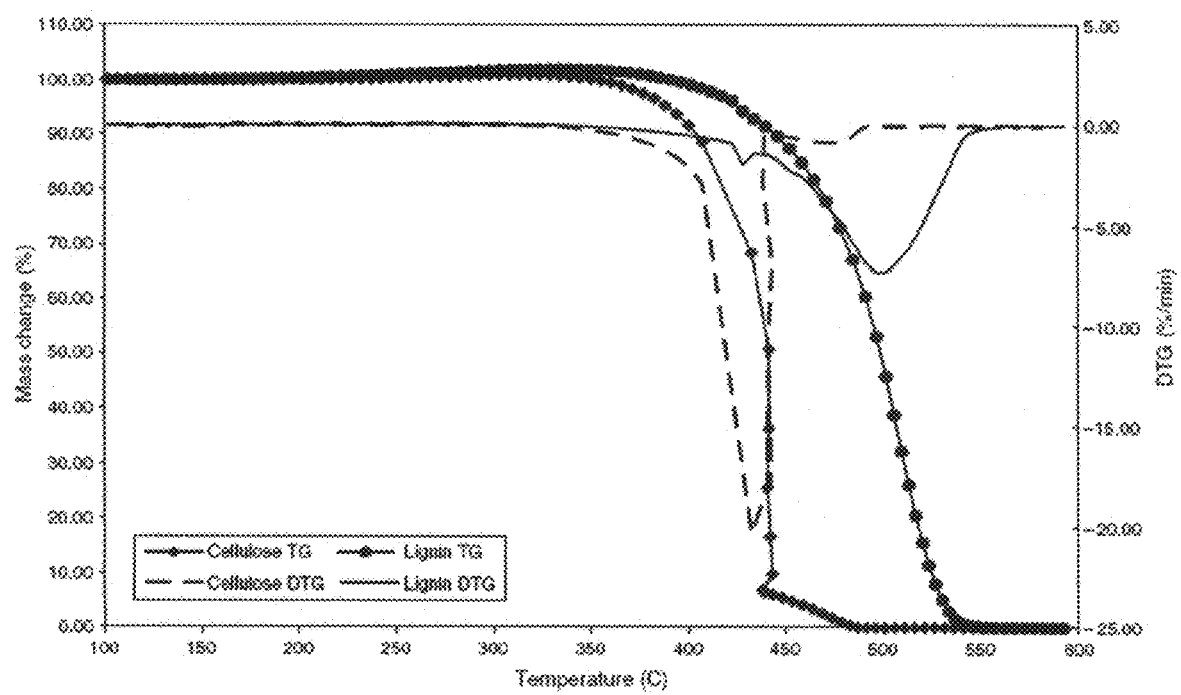
FIG. 5 shows TG-DTG profiles for carbon samples derived from cellulose and lignin, respectively. The carbon samples were obtained by processing either cellulose or lignin in air at 240° C. for several hours followed by carbonization at 400° C.

Thermogravimetric analysis of delignified filter paper and organosolve lignin was performed and this research demonstrates that cellulose is ablated faster at lower temperatures than lignin, as shown in FIG. 5.

Figure 6:
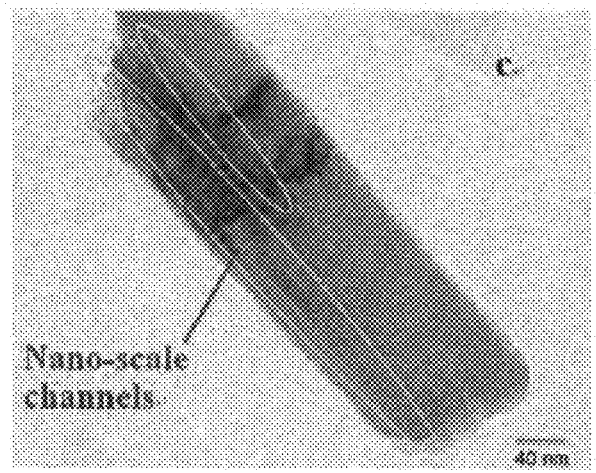
FIG. 6 shows a TEM image of the early formation of nano-channels within the cell wall of bamboo fiber after only two cycles of the heating process

The cellulose microfibrils ablate more rapidly within the cell wall than the surrounding lignin matrix. While not wishing to be bound by theory, the inventors herein believe that these results show that carbonization at low temperatures is a stepwise process that forms nanoscale channels that are derived from the ablation of residual cell wall microfibrils in the carbonized cell wall structure. For example, the TEM imaging in FIG. 6 shows the early formation of nanochannels within the cell wall of bamboo fiber after only two cycles of the heating process described herein. The nanochannels act as a template which mediates the production of carbon nanotubes. During the heating of the materials, the nanochannels concentrate carbon vapor, preventing the carbon vapor from escaping from the reaction vessel, thus creating an environment conducive to the formation of carbon nanotubes.

The microfibril alignment in the cell wall can influence the alignment of nanotubes, as seen in FIG. 2. Also, it is to be noted that, in certain embodiments, the conditions of low pressure combined with the introduction of controlled amounts of air can greatly facilitate the ablation of cellulose.

In addition, the diameter of the carbon nanotubes formed can be controlled by varying one or more of the size or type of the catalyst, and/or varying the processing parameters (for example, the amount of oxygen and/or temperature ranges and heating/cooling cycles) employed.

Again, while not wishing to be bound by theory, the inventors herein now believe that at least one mechanism involved in the formation of carbon nanotubes using the carbon nanotube formation process described herein is that the catalyst, such as nickel chloride, is reduced to nanometer size nickel metal particles. The nanometer sized particles function as "seeds" which cause the organic volatiles produced from the thermal decomposition of the wood or non-wood lignocellulosic fibers components to be deposited on the nanoparticles, thus forming the carbon nanotubes.

As used herein, "carbon nanotubes" are an allotrope of carbon. Carbon nanotubes formed from the cylindrical positioning of carbon molecules have novel properties that make them useful in a wide variety of applications in nanotechnology, electronics, optics and other fields of materials science. Carbon nanotubes exhibit extraordinary strength and unique electrical properties, and are efficient conductors of heat. It is believed that nanotubes are members of the fullerene structural family, which also includes Buckminsterfullerenes or "buckyballs." Whereas buckyballs are spherical in shape, a nanotube is cylindrical, with at least one end typically capped with a hemisphere of the buckyball structure. The name "nanotube" is derived from its size, since the diameter of a nanotube can range from a few nanometers (approximately 50,000 times smaller than the width of a human hair), up to several millimeters in length. There are two main types of nanotubes: single-walled nanotubes (SWNTs) and multi-walled nanotubes (MWNTs).

The nature of the bonding of a nanotube is described by applied quantum chemistry, specifically, orbital hybridization. Nanotubes are composed entirely of $sp^2$ bonds, similar to those of graphite. This bonding structure, which is stronger than the $sp^3$ bonds found in diamond, provides the molecules with their unique strength. Nanotubes often naturally align themselves into "ropes" held together by Van der Waals forces. Under high pressure, nanotubes can merge together, trading some $sp^2$ bonds for $sp^3$ bonds, giving great possibility for producing strong, unlimited-length wires through high-pressure nanotube linking.

The following examples are intended to illustrate preferred embodiments of the invention and should not be interpreted to limit the scope of the invention as defined in the claims, unless so specified.

Example I

A carbon nanotube formation process is used for producing carbon nanotubes from plant fiber using a cyclic heating carbon nanotube formation process.

In Five starting materials (including TMP fibers, purified lignin, filter paper, Avicel® cellulose, and α-cellulose) were used in this experiment. The individual samples were heated within a reaction vessel (such as, for example, in a ceramic tube in a Lindburg tube furnace). In the experiments herein the reaction vessel used was an aluminum end cap/sample insertion assembly that was attached to the open end of the ceramic tube in order to control the gas delivery and exit. All of the starting materials were initially preheated in air at about 240° C. for several hours under ambient pressure to form pre-treated fibers. The pre-treated fibers were then heated in a cyclical manner.

In certain embodiments, more than one heating cycle is used and fluctuating temperatures are used to heat the sample material in repeating cycles.

In one embodiment, one cycle of the cyclic thermal procedure includes the following steps:

1) evacuating the reaction vessel containing the pre-treated fibers to about 0.1 MPa;
2) dispensing air (for example, about 40 mL) into the reaction vessel;
3) heating the reaction vessel to about 400° C. for 10 minutes by insertion into the furnace;
4) removing the reaction vessel from the heat and allowing the reaction vessel to cool to about room temperature within about 15 minutes.

In certain embodiments, the reaction vessel was cooled down as fast as possible. In one example, a fan was used to cool within 15 minutes.

In the experiments described herein, a total of 35 cycles were conducted for each type of material. The resulting carbon samples were washed with 15% hydrochloric acid solution with the aid of sonic pulsation. The carbon samples were then neutralized with deionized distilled water and centrifuged. Finally, the samples were dried at 110° C. for 12 hours. No metal catalysts were used in this experiment.

No tubular structures were observed in the samples made from lignin, filter paper, Avicel® cellulose, and α-cellulose. However, analysis of the TMP fibers showed clear evidence of carbon nanotube production, as shown in the TEMs in FIG. 1 and FIG. 2). It is to be noted that, although no metal catalysts were used in this experiments, trace levels of metals may be found in all processed carbon materials. However, no catalyst particles were noted in any of the carbon nanotubes observed. While not wishing to be bound by theory, the inventors herein believe that one reason why the carbon nanotubes were produced using the intact TMP wood fiber, but not from the other sample types, is that the nano-architectural arrangement of the chemical components in the wood cell walls aid in the carbon nanotube formation when the TMP fibers are subjected to the low temperature cyclic carbon nanotube formation heating process described herein.

Example II

A carbon nanotube formation process is used for producing carbon nanotubes from plant fiber using a rapid heating, or flash, heating carbon nanotube formation process.

In this experiment, the reaction vessel comprised a quartz test tube, 1 inch in diameter and 8 inches in length, which was placed in a tube furnace previously heated to 1000° C. When the quartz tube temperature rose to about 1000° C., the sample (here, pretreated wheat stalk fibers) was added to the preheated reaction vessel. After about 5 to about 10 seconds, the quartz tube containing the sample was quickly removed from the heated tube furnace and cooled naturally to room temperature. In this example, the wheat stalk was pretreated by oven drying before the flash heating process.

Thus, in certain embodiments, the pre-heating temperature of the reaction vessel can be approximately the same as the rapid, or flash heating temperature. In other embodiments, the pre-heating temperature of the reaction vessel can be either higher or lower than the rapid, or flash heating temperature.

Example III

A carbon nanotube formation process is used with a suitable catalyst that is applied in solution to fiber samples. In the example herein the catalysts nickel chloride and iron chloride were used at 12% and 20% solution concentrations, respectively. About 3 drops of solution were used to soak 500 mg of oven-dried wheat stalk fiber samples. The catalyst treated fiber samples were then dried at about 105° C. for about 1 hour. The results showed that no carbon nanotubes were found in samples without catalyst. Also, no carbon nanotubes were found in the sample treated with iron chloride. However, the sample treated with nickel chloride was found to contain about 30% (by volume) carbon nanotubes, as can be seen in the TEMs in FIG. 3. In this example, while not wishing to be bound by theory, the inventors now believe that the mechanism for forming the carbon nanotubes involves the reduction of the nickel chloride catalyst to nanometer size nickel metal particles. The nanoparticles of catalyst functions as "seeds," which, in turn, allow the organic volatiles produced from the thermal decomposition of the fiber components to be deposited on the nanoparticles, thereby forming the carbon nanotubes.

Example IV

In yet another embodiment, steel with carbon nanotubes incorporated within may be produced by incorporating plant fiber as a carbon source into the molten iron and blowing oxygen or air into the molten iron as it is heated as in examples one and two below. Although not wishing to be bound by theory, the authors believe that they have discovered the process used to produce superior steel products such as the original Damascus steel which was known for its use in producing products such as sword and daggers with superior and legendary sharpness, flexibility and durability. Damascus swords are now known to contain carbon nanotubes within the carbon steel matrix. Thus, in another aspect, the inventors herein now believe that the present carbon nanotube formation described herein can be used for the incorporation of plant materials into steel to produce a "carbon nanotube/steel" material that has the qualities of the legendary steel.

Example V

In another aspect, there is provided herein metal composites that include carbon nanotubes derived from natural cellulosic materials.

In one embodiment, the composite comprises: i) at least one metal, and ii) carbon nanotubes that are derived from natural cellulosic materials. The plant fiber is incorporated into a metal material, such as molten iron, to allow the carbonization process to occur within the metal material, thus producing carbon nanotubes within the steel. The new type of carbon steel will contain carbon nanotubes rather than just amorphous carbon in the steel. It is believed that the carbon nanotube steel composite produced using the process herein will provide an improved steel having higher strength and durability. Such improved steel can be used, for example, as specialty parts for high tech products and auto parts that have the improved wear and durability needed for high stress high value steel products.

Example VI

In another aspect, there is provided herein precursor composites that include carbon nanotubes derived from natural cellulosic materials.

In one embodiment, the composite comprises: i) at least one precursor material, and ii) carbon nanotubes that are derived from natural cellulosic materials. The plant cellular materials are themselves used as a precursor for other composite materials. For example, carbonized wood containing carbon nanotubes can be used as a preform that is infused with a material. In one embodiment, carbonized wood containing carbon nanotubes can be used as a preform that is infused with one or more phenolic resins to produce superior carbon nanotube reinforced carbon composites. In another embodiment, the carbon nanotubes derived from natural cellulosic materials can be incorporated into fiber reinforced polymer (FRP) composites.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

Therefore, it is intended that the invention not be limited to the particular embodiment disclosed herein contemplated for carrying out this invention, but that the invention will include all embodiments falling within the scope of the claims.

REFERENCES

The publications and other materials used herein to illuminate the invention or provide additional details respecting the practice of the invention, are incorporated by reference herein, and for convenience are provided in the following bibliography.

Citation of any of the documents recited herein is not intended as an admission that any of the foregoing is pertinent prior art. All statements as to the date or representation as to the contents of these documents is based on the information available to the applicant and does not constitute any admission as to the correctness of the dates or contents of these documents.

A, O., E. M, et al. 1976. Filamentous growth of carbon through benzene decomposition. Journal of Crystal Growth. 32: 335-349.

Iijima, S. 1991. Helical microtubules of graphitic carbon. Nature. 354(7): 56-58.

Monthioux, M. and V. L. Kuznetsov 2006. Who should be given the credit for the discovery of carbon nanotubes. Carbon. 44: 1621-1623.

T., G. 1995. Catalytic growth of single-walled nanotubes by laser vaporization. Chemical Physics Letters. 243: 49-54.

Yacaman, M. 1993. Catalytic growth of carbon microtubules with fullerene structure. Appl. Phys. Lett. 62: 202-204.

Byrne, C. E. and D. C. Nagle, *Carbonization of wood for advanced materials applications*. Carbon, 1997. 35(No. 2): p. 259-266.

Wienhold, P. D., A. M. Lennon, and J. C. Roberts. *Characterization of carbonized wood core for use in FRP sandwich ship structures*. in 45th *International SAMPE Symposium*. 2000.

Rambo, C. R., et al., *Manufacturing of biomorphic (Si, Ti, Zr)-carbide ceramics by sol-gel processing*. Carbon, 2005. 43: p. 1174-1183.

Zollfrank, C. and H. Sieber, *Microstructure and phase morphology of wood derived biomorphous SiSiC-ceramics*. Journal of the European Ceramic Society, 2004. 24 (2004): p. 495-506.

Klingner, R., J. Sell, and T. Zimmermann, *Wood-derived porous ceramics via infiltration of SiO2-sol and carbothermal reduction*. Holzforschung, 2003. 57 (2003): p. 440-446.

Brown, R. A., et al., *Production and characterization of synthetic wood chars for use as surrogates for natural sorbents*. Organic Geochemistry, 2006. 37: p. 321-333.

Reibold, M.; Levin A. A., Kochmann W., Pätzke N., Meyer D. C. (16). *Materials: Carbon nanotubes in an ancient Damascus sabre*. Nature, 2006. 444: 286.

What is claimed is:

1. A process for producing carbon nanotubes comprising:
    a) establishing a supply of plant cellular material in a reaction vessel;
    b) introducing a controlled amount of oxygen into the reaction vessel;
    c) subjecting the reaction vessel to at least one heating cycle which includes heating and then cooling the reaction vessel to a temperature while maintaining the temperature between a desired maximum temperature and a desired minimum temperature, wherein the reaction vessel is at less than atmospheric pressure during at least one heating cycle;
    d) subjecting the reaction vessel to additional heating cycles sufficient to produce carbon nanotubes; and
    e) cooling the reaction vessel to a temperature below the temperature in the heating cycle.

2. The carbon nanotube formation process of claim 1, wherein the heating cycle includes heating the reaction vessel at an accelerated rate of temperature change.

3. The carbon nanotube formation process of claim 1, wherein the plant cellular material comprises fibers from wood and non-wood species.

4. The carbon nanotube formation process of claim 1, wherein the plant cellular material comprises lignocellulosic fibers.

5. The carbon nanotube formation process of claim 1, wherein the amount of oxygen used during heating ranges from about 1 to about 10 milliliter per gram of plant cellular material.

6. The carbon nanotube formation process of claim 1, wherein a balance of the atmosphere in the reaction vessel comprises an inert gas.

7. The carbon nanotube formation process of claim 6, wherein the balance of the atmosphere comprises an inert gas including one or more of nitrogen and argon.

8. The carbon nanotube formation process of claim 1, wherein the oxygen is either supplied substantially continuously or in pulses to the reaction vessel.

9. The carbon nanotube formation process of claim 1, wherein more than one heating cycle is used and fluctuating temperatures are used to heat the supply of plant cellular material in repeating cycles.

10. The carbon nanotube formation process of claim 1, wherein the process includes from about 30 to about 40 heating cycles.

11. The carbon nanotube formation process of claim 1, wherein the reaction vessel is heated to a range of about 400° C. to about 500° C. for at least a portion of the time period.

12. The carbon nanotube formation process of claim 1, wherein for each heating cycle, the plant cellular material is heated rapidly up to about 600° C. and held at about 600° C. for at least about 10 minutes.

13. The carbon nanotube formation process of claim 1, wherein at least one catalyst is added to the supply of plant cellular material.

14. The carbon nanotube formation process of claim 1, wherein the supply of plant cellular material is preheated in air.

15. The carbon nanotube formation process of claim 1, wherein the process is conducted as a batch process.

16. A carbon nanotube formation process for producing carbon nanotubes comprising:
   a) pre-heating a reaction vessel to a desired temperature;
   b) introducing a supply of plant cellular material in the pre-heated reaction vessel;
   c) introducing a controlled amount of oxygen into the pre-heated reaction vessel;
   d) subjecting the pre-heated reaction vessel to a single heating cycle which includes heating the pre-heated reaction vessel to temperatures up to about 1000° C. in the presence of the controlled amount of oxygen; wherein the reaction vessel is at less than atmospheric pressure during the heating cycle; and,
   e) cooling the reaction vessel at a desired rate of cooling.

17. The carbon nanotube formation process of claim 16, wherein a substantially constant temperature is used during the heating cycle.

18. The carbon nanotube formation process of claim 16, wherein the heating cycle is about 10 seconds or less.

19. The carbon nanotube formation process of claim 16 wherein the plant cellular material comprises fibers from wood and non-wood species.

20. The carbon nanotube formation process of claim 16, wherein the plant cellular material comprises lignocellulosic fibers.

21. The carbon nanotube formation process of claim 16, wherein the amount of oxygen used during heating ranges from about 1 to about 10 milliliter per gram of plant cellular material.

22. The carbon nanotube formation process of claim 16, wherein a balance of the atmosphere in the reaction vessel comprises an inert gas.

23. The carbon nanotube formation process of claim 22, wherein the balance of the atmosphere comprises an inert gas including one or more of nitrogen and argon.

24. The carbon nanotube formation process of claim 16, wherein at least one metal catalyst is added to the supply of plant cellular material.

25. The carbon nanotube formation process of claim 24, wherein the metal catalyst comprises one or more transition metals.

26. The carbon nanotube formation process of claim 24, wherein the metal catalyst includes one or more of nickel chloride, nickel acetate, iron chloride, palladium, and platinum.

27. The carbon nanotube formation process of claim 24, wherein between about 0.05 and about 0.15 weight percent of a metal catalyst, as based on the weight of the plant cellular material, is added to the supply of plant cellular material.

\* \* \* \* \*